(12) United States Patent
Boutnaru

(10) Patent No.: US 12,229,774 B2
(45) Date of Patent: Feb. 18, 2025

(54) DETECTING MALWARE BY MONITORING CLIENT-SIDE MEMORY STACKS

(71) Applicant: PAYPAL, INC., San Jose, CA (US)

(72) Inventor: Shlomi Boutnaru, Modiin (IL)

(73) Assignee: PAYPAL, INC., San Jose, CA (US)

( * ) Notice: Subject to any disclaimer, the term of this patent is extended or adjusted under 35 U.S.C. 154(b) by 693 days.

(21) Appl. No.: 17/240,169

(22) Filed: Apr. 26, 2021

(65) Prior Publication Data

US 2021/0312446 A1 Oct. 7, 2021

Related U.S. Application Data

(63) Continuation of application No. 15/806,965, filed on Nov. 8, 2017, now Pat. No. 10,990,975.

(51) Int. Cl.
*G06Q 20/40* (2012.01)
*G06F 21/56* (2013.01)
*H04L 9/40* (2022.01)

(52) U.S. Cl.
CPC ....... *G06Q 20/4014* (2013.01); *G06F 21/566* (2013.01); *G06Q 20/4016* (2013.01); *H04L 63/1425* (2013.01); *H04L 63/145* (2013.01)

(58) Field of Classification Search
CPC ............ G06Q 20/4014; G06Q 20/4016; G06F 21/566; G06F 21/56
See application file for complete search history.

(56) References Cited

U.S. PATENT DOCUMENTS

| 5,805,674 A | 9/1998 | Anderson, Jr. |
| 8,239,944 B1 * | 8/2012 | Nachenberg ........ H04L 63/1416 713/188 |

(Continued)

FOREIGN PATENT DOCUMENTS

| CN | 103886252 A | 6/2014 |
| CN | 106504000 A | 3/2017 |

(Continued)

OTHER PUBLICATIONS

International Preliminary Report on Patentability for Application No. PCT/US2018/059701 mailed on May 22, 2020, 7 pages.

(Continued)

*Primary Examiner* — Daniel S Felten
(74) *Attorney, Agent, or Firm* — Haynes and Boone, LLP

(57) ABSTRACT

Methods and systems for detecting malware by monitoring client-side memory stacks are described. A request for a payment process is received and a client-side memory stack is populated with a series of functions corresponding to the requested payment process. The execution of each function is monitored to determine whether the series of functions and an order of execution of the functions from the client-side memory stack are the same as an expected series of functions and in an expected order corresponding to the payment process. The monitoring also determines whether the number and types of parameters called by the functions are the same as the expected number and types of parameters. The monitoring further determines whether the timing of the execution of the functions is the same as an expected timing. Remedial action is performed when the any of these factors is determined to be different than what is expected.

20 Claims, 6 Drawing Sheets

(56) References Cited

U.S. PATENT DOCUMENTS

| | | | |
|---|---|---|---|
| 8,401,982 B1* | 3/2013 | Satish | G06N 20/00 706/20 |
| 8,402,540 B2* | 3/2013 | Kapoor | H04L 67/34 709/224 |
| 8,595,845 B2* | 11/2013 | Basavapatna | H04L 63/1408 713/168 |
| 8,850,588 B2* | 9/2014 | Kumar | H04L 63/1425 726/25 |
| 9,319,221 B1 | 4/2016 | Awad et al. | |
| 9,357,268 B2 | 5/2016 | Zises | |
| 9,424,570 B2 | 8/2016 | Fefferman | |
| 9,639,837 B2 | 5/2017 | Laracey | |
| 9,672,355 B2* | 6/2017 | Titonis | H04W 12/12 |
| 9,792,430 B2* | 10/2017 | Golshan | G06F 21/552 |
| 9,853,997 B2* | 12/2017 | Canzanese, Jr. | G06F 21/55 |
| 10,050,982 B1* | 8/2018 | Guerra | H04L 63/1416 |
| 10,341,365 B1 | 7/2019 | Ha | |
| 10,382,479 B2* | 8/2019 | Adams | H04L 63/145 |
| 10,586,042 B2* | 3/2020 | Stopel | G06F 21/554 |
| 10,726,411 B2 | 7/2020 | Nuzzi et al. | |
| 11,082,444 B2* | 8/2021 | MacLeod | G06F 11/2038 |
| 11,347,853 B2* | 5/2022 | Shanmugavelayutham | G06F 21/567 |
| 2005/0108710 A1 | 5/2005 | Patiejunas | |
| 2008/0166997 A1 | 7/2008 | Sun et al. | |
| 2011/0239300 A1* | 9/2011 | Klein | G06F 21/565 726/23 |
| 2011/0321139 A1 | 12/2011 | Jayaraman et al. | |
| 2012/0291131 A1 | 11/2012 | Turkulainen et al. | |
| 2014/0282893 A1 | 9/2014 | Sheller et al. | |
| 2015/0215335 A1 | 7/2015 | Giuliani et al. | |
| 2015/0371039 A1 | 12/2015 | Suominen | |
| 2016/0055564 A1 | 2/2016 | Achuthan et al. | |
| 2016/0212159 A1 | 7/2016 | Gupta et al. | |
| 2016/0232347 A1 | 8/2016 | Badishi | |
| 2018/0046803 A1 | 2/2018 | Li et al. | |
| 2019/0095619 A1* | 3/2019 | Hay | G06F 21/566 |
| 2019/0205530 A1 | 7/2019 | Brown | |
| 2021/0211438 A1* | 7/2021 | Trim | G06N 20/00 |

FOREIGN PATENT DOCUMENTS

| | | |
|---|---|---|
| CN | 107251513 A | 10/2017 |
| WO | 2019226914 A1 | 11/2019 |

OTHER PUBLICATIONS

Hu X, et al. "Large-Scale Malware Indexing Using Function-Call Graphs," Proceedings of the 16th ACM Conference on Computer and Communications Security, Nov. 9, 2009, pp. 611-620.

Park Y., et al., "Fast Malware Classification by Automated Behavioral Graph Matching," Proceedings of the Sixth Annual Workshop on Cyber Security and Information Intelligence Research, Apr. 21, 2010, pp. 1-4.

European Application No. 18877225.5, Supplemental Partial European Search Report mailed on Jun. 21, 2021, 16 pages.

International Appl. No. PCT/US2018/059701, International Search Report and Written Opinion mailed Feb. 12, 2019, 9 pages.

Idika, N., et al., "A Survey of Malware Detection Techniques", Department of Computer Science, Purdue University (Feb. 2007) ( Year: 2007).

European Appl. No. 18877225.5, Extended European Search Report mailed Sep. 22, 2021, 14 pages.

Communication pursuant to Article 94(3) EPC dated Oct. 24, 2024, received Oct. 29, 2024, in related Application No. 18877225.5, 7 pages.

* cited by examiner

DETECTING MALWARE BY MONITORING CLIENT-SIDE MEMORY STACKS

CROSS REFERENCE TO RELATED APPLICATION

The present invention is a continuation of U.S. patent application Ser. No. 15/806,965, filed Nov. 8, 2017, which is incorporated herein by reference in its entirety.

TECHNICAL FIELD

The subject technology generally relates to securing payment transactions initiated from an electronic device and more particularly, relates to various techniques for detecting anomalies on a client-side electronic device running a payment system application for initiating payment transactions.

BACKGROUND

The use of electronic devices to perform secure financial transactions has become more common over the years as the volume of online purchases continues to increase. One option for executing the payment for such transactions is by using payment system applications. Payment system applications (e.g., PayPal's One Touch™) provide for third-party payment processing that can be used across several merchants, thereby reducing the friction for consumers when making online purchases. As these applications become more popular, however, they also become more lucrative targets for hackers. For example, payment system applications that run on electronic devices for executing transactions between users may be vulnerable to hacking. To prevent such compromises from occurring, certain forms of authentication may be used. While authentication processes may prevent some amount of hacking, these processes are not indomitable, especially as hackers become more sophisticated. These types of security compromises may result in monetary loss to consumers and/or merchants, as well as exposure of sensitive personal and financial information.

SUMMARY

According to various aspects of the subject technology, a system for detecting malware by monitoring client-side memory stacks is provided. A request for a payment process is received and a client-side memory stack is populated with a series of functions corresponding to the requested payment process. The execution of each function of the series of functions from the client-side memory stack is monitored. Based on the monitoring, a determination is made whether the series of functions and an order in which the functions are being executed from the client-side memory stack are a same as an expected series of functions and in an expected order of execution of the functions that correspond to the payment process. Remedial action is executed on the system when the series of functions executed from the client-side memory stack is determined to not be the same as the expected series of functions or in the expected order of execution of the functions corresponding to the payment process.

According to various aspects of the subject technology, a method for detecting malware by monitoring client-side memory stacks is provided. A request for a payment process is received and a client-side memory stack is populated with a series of functions corresponding to the requested payment process. The execution of each function of the series of functions from the client-side memory stack is monitored. Based on the monitoring, a determination is made whether a set of parameters retrieved by each function of the series of functions is a same as an expected set of parameters to be retrieved by the function of the payment process. Remedial action is executed on the system when the set of parameters retrieved by the function is determined to not be the same as the set of parameters to be retrieved by the function of the payment process.

According to various aspects of the subject technology, a non-transitory machine-readable medium having stored thereon machine-readable instructions executable to detect malware by monitoring client-side memory stacks is provided. A request for a payment process is received and a client-side memory stack is populated with a series of functions corresponding to the requested payment process. The execution of each function of the series of functions from the client-side memory stack is monitored. Based on the monitoring, a determination is made whether an execution time of each function of the series of functions is a same as an expected execution time for the function of the payment process. Remedial action is executed on the system when the time for the execution of one of the functions of the series function is determined to not be a same as the expected time for execution for the function of the payment process.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
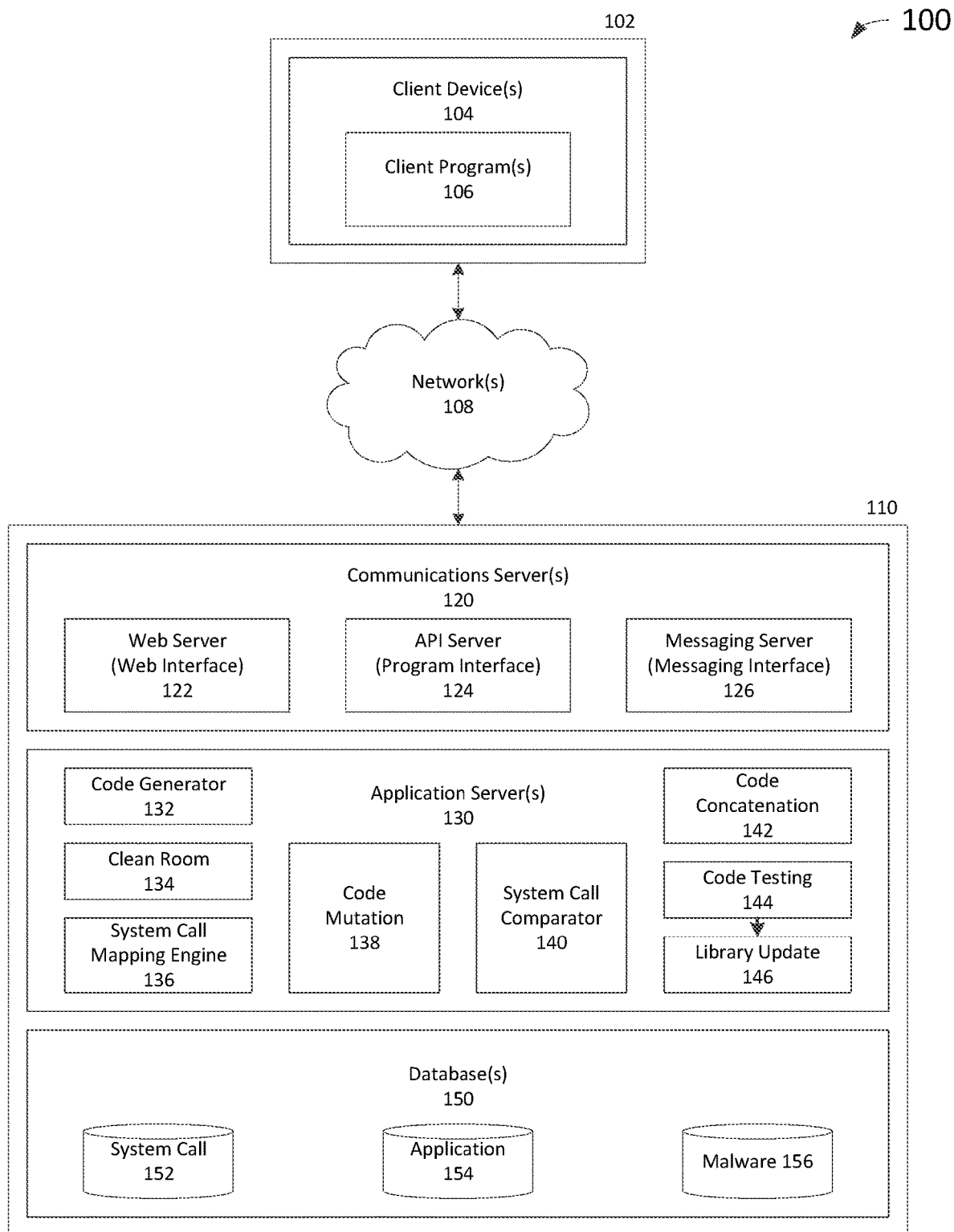
FIG. 1 is a block diagram of an exemplary computing system on which malware may be detected by monitoring client-side memory stacks.

Payment applications, particularly ones that run on client computing devices, may encounter a variety of issues at the hand of unscrupulous individuals. Although efforts can be made to perform monitoring at various locations (e.g., utilizing different forms of authentication and authorization), such efforts are not necessarily enough to precisely determine problems affecting these applications.

Payment applications running on a client device may become infected by malware or otherwise infiltrated by bad actors, thereby generating serious security issues. Malware infected applications may instruct the device to perform functions that are not authorized by a user in a covert manner that avoids detection by conventional manners. For example, the malware may alter the functions executed by the application to produce a different set of results than intended (e.g., cause unauthorized payments or money transfers).

Traditional malware detection methods may not be sufficient to detect more sophisticated malware. For example, signature based detection can be problematic because obfuscation techniques can create code series that look different (i.e., have a different signature) but perform the same actions as the original code. This obfuscation technique may be used to bypass signature matching. Additionally, using techniques like WebInject to inject JavaScript to execute web pages in a browser can further disable known protection mechanisms.

By providing a system that monitors functions being executed off the client-side memory stack, certain metrics may be measured or recorded and compared to expected values for the function being performed. A measured or recorded value deviating from an expected value suggests that there may be an anomaly in the execution of the functions. Under such instances, the execution of the function may be suspended and an administrator or owner of the account may be prompted to investigate further. The monitoring system may compare certain values of the monitored functions to a state machine in order to determine whether a match exists between the functions, or whether certain attributes falls within acceptable parameters. The state machine may be implemented as a JavaScript application, a plug-in, or it may be incorporated into the browser as an external application. Alternatively, or in addition, the state machine may be implemented in the operating system of the computing device so that it's active and running in the background at boot up of the user device, and thus not easily disabled.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112 (f) for that component.

FIG. 1 illustrates an exemplary embodiment of a computing system adapted for implementing one or more embodiments disclosed herein to detect malware by monitoring client-side memory stacks in order to protect users of payment system applications. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be a server that provides various services to client devices, such as malware detection and/or malware library updates. Application servers 130 may include multiple servers and/or components. For example, application servers 130 may include a code generator 132, clean room 134, system call mapping engine 136, code mutation engine 138, system call comparison engine 140, code concatenation engine 142, testing engine 144, and/or library update engine 146. These servers and/or components, which may be in addition to other servers, may be structured and arranged to help protect devices against malware.

Application servers 130, in turn, may be coupled to and capable of accessing one or more databases 150 including system call database 152, application database 154, and/or malware database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
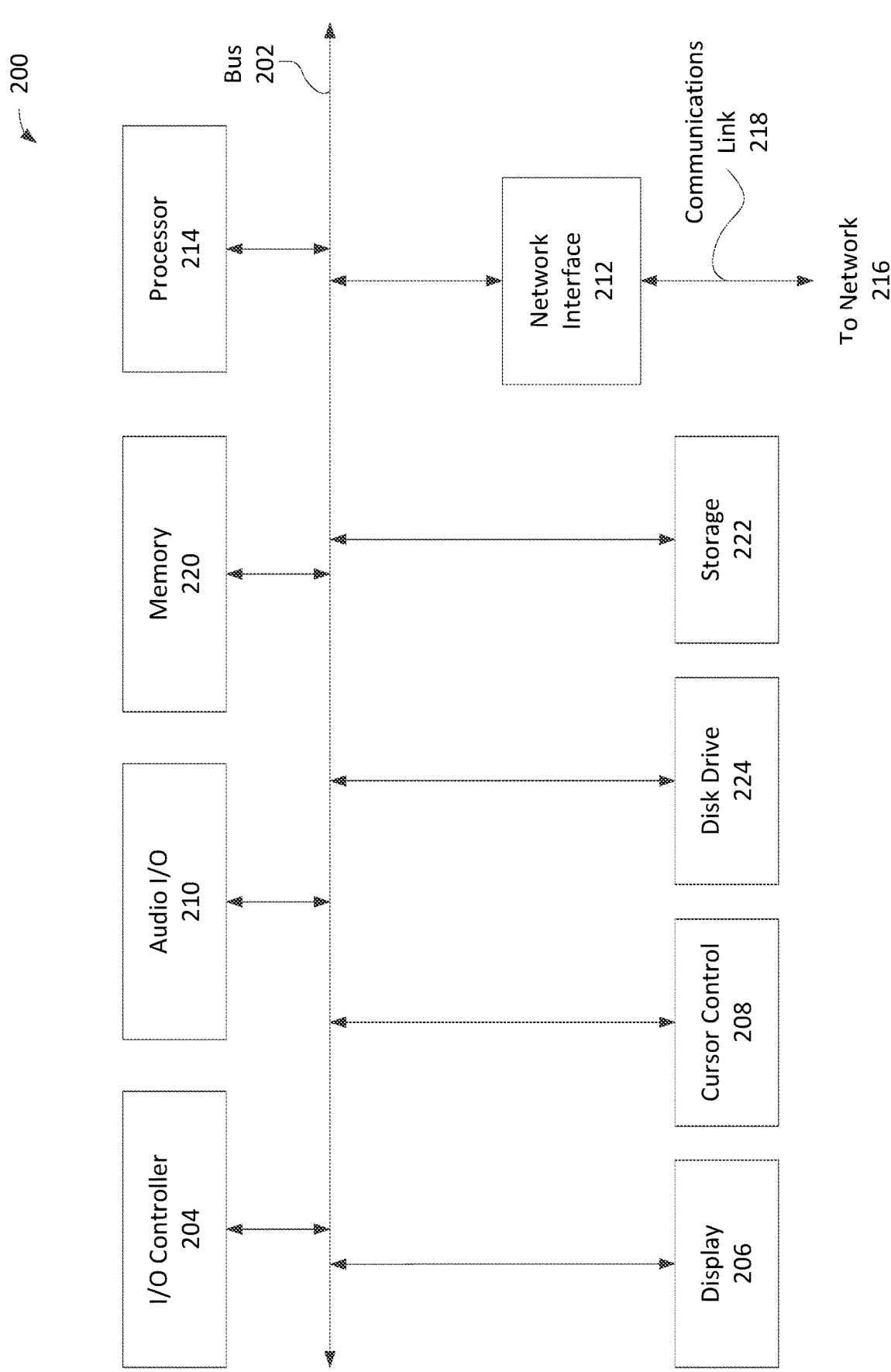
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio input/output component 210 may also be included to allow a user to use voice for inputting information by converting audio signals. Audio I/O component 210 may allow the user to hear audio. A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
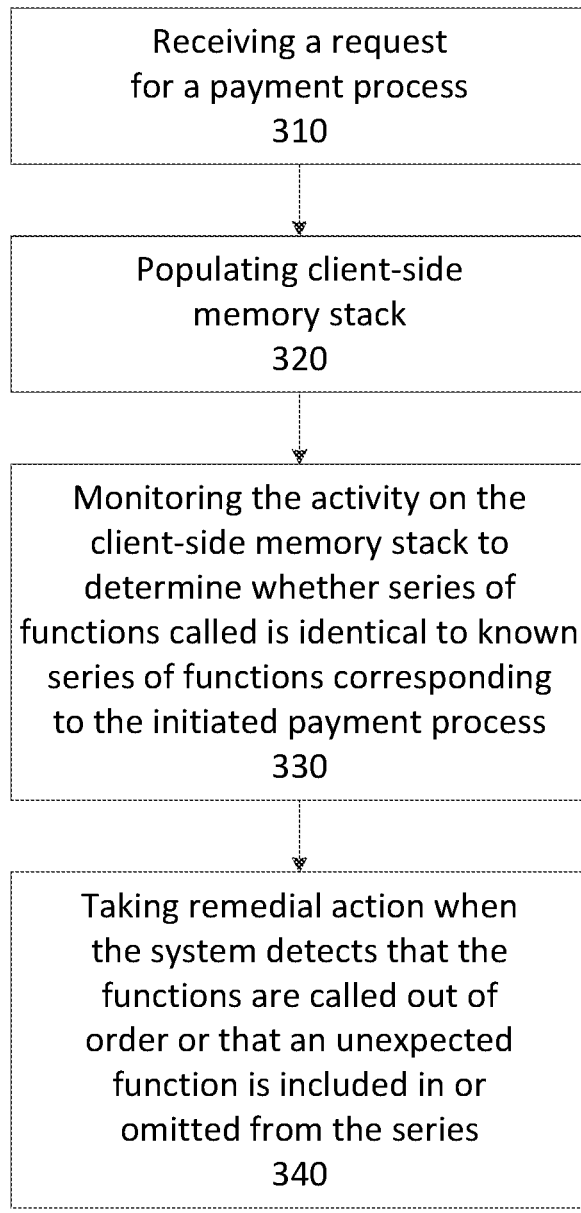
FIG. 3 is a flow diagram illustrating an exemplary malware detection process performed based on a known series and order of the functions.

FIG. 3 illustrates an exemplary process 300 for detecting malware by monitoring client-side memory stacks, for example, JavaScript stacks. JavaScript processes messages from a queue one at a time, and each time a new message is loaded, functions are called to a stack. The stack may increase or decrease in size depending on the functions called. Once all the functions of a message have been called, JavaScript may proceed to a next message in the queue with corresponding functions that are called. This event loop may be monitored to detect the presence of malware.

At operation 310 the system receives a request for a payment process for a transaction via a payment system application running on a client device. Once payment has been initiated, the functions begin to populate the client-side memory stack in step 320. The system then monitors the activity on the client-side memory stack in step 330 to determine whether the series of functions being called is identical to a known series of functions that correspond to the initiated payment process. In other words, the system expects certain functions to be called for a particular payment process. The system further expects the calls of these functions to be made in a particular order.

In one example, the system expects functions A→B→C to be called in that order for a particular message associated with a payment being processed. If, however, the system, while monitoring the functions, detects that the functions are called out of order (e.g., A→C→B), or that an unexpected function is included in or omitted from the series (e.g., A→D→B→C or A→C, remedial action is taken in step 340. A determination that the expected series of functions is called in the expected order suggests that the system is operating properly and thus not compromised. On the other hand, a determination that the expected series of functions is not called in the expected order suggests that the system is not operating properly and thus may have been compromised.

In some embodiments, the monitoring of the client-side memory stack is used to detect malware that may have been installed on the system and that modifies the behavior of the JavaScript executed by the browsers. In certain instances, malware that is installed on the system may cause the payment application to conduct transactions that may be detrimental to the owner of an account and for the gain of a hacker. By detecting such unusual activity that suggests that the system is not operating properly, the system may protect the owner of the account from such harms. Upon making a determination that the expected functions are not called in the expected order, remedial action such as interrupting the payment process and/or flagging it for review may be taken. The system may also alert an administrator and/or the owner of the account subject to the potential breach.

Figure 4:
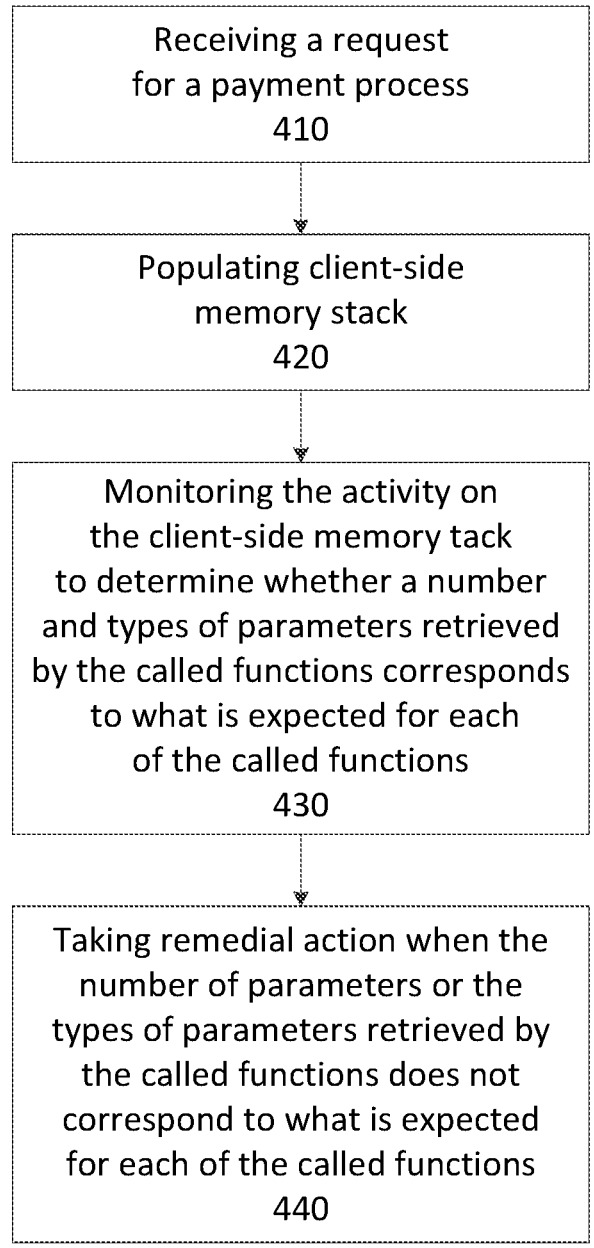
FIG. 4 is a flow diagram illustrating an exemplary malware detection process performed based on parameters retrieved by the functions.

FIG. 4 illustrates an alternative exemplary process 400 for detecting malware by monitoring client-side memory stacks. Similar to process 300, the system receives a request for initiating payment for a transaction via a payment system application in step 410. In response to receiving the request, payment is initiated by calling the corresponding functions and populating the client-side memory stack with the called functions in step 420. The system then monitors the activity on the client-side memory stack in step 430 to determine whether a number of parameters and/or the types of parameters is retrieved by the called functions corresponds to what is expected for each of the called functions. That is, for each function called, the system expects a specific number of parameters and/or types of parameters to be retrieved by the function.

For example, the system expects a specific function called by the payment process to retrieve two parameters. If, however, the system detects that the function called instead retrieves three parameters (or any number of parameters which is not two), remedial action is taken in step 440. Additionally or alternatively, the system may expect a specific function called by the payment process to retrieve parameters of types a and b. If, however, the system detects that the function called instead retrieves parameters of types y and z (or any combination that is not specifically types a and b), remedial action is taken in step 440.

In some embodiments, the system may expect certain parameters to be passed to the functions on the stack itself, or at specific locations, which can also be monitored by the system. If the system detects that the parameters aren't passed to the functions on the stack as expected, or are not passed at specific locations, remedial action is taken in step 440.

As discussed above, a determination of the function operating outside of an expected norm suggests that the system is not operating properly and thus may have been compromised. When such a determination is made, remedial measures such as interrupting the payment process and/or flagging it for review may be taken. In some instances, an alert may be sent to the administrator and/or the owner of the account of subject to the potential breach.

Figure 5:
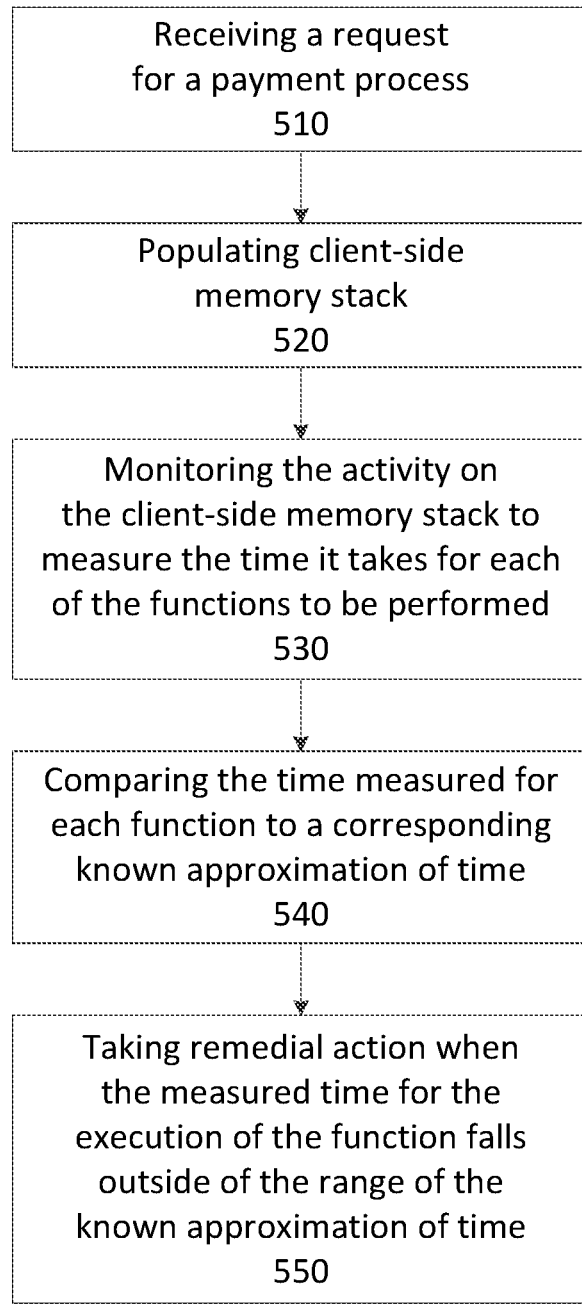
FIG. 5 is a flow diagram illustrating an exemplary malware detection process performed based on the timing of the execution of functions.

FIG. 5 illustrates another exemplary process 500 for detecting malware by monitoring client-side memory stacks. Similar to processes 300 and 400 described above, the system receives a request for initiating payment for a transaction via a payment system application in step 510, which causes the functions corresponding to the payment to be called and the client-side memory stack to be populated with the called functions in step 520. The system then monitors the activity being conducted on the client-side memory stack in step 530 to measure the time it takes for each of the functions to be performed, e.g., by a JavaScript engine. In step 540, the time measured for each function is then compared to a corresponding known approximation of time in which the system expects the function to be performed, in order to determine if any anomalies exist. For example, the system measures the amount of time elapsed from the time that a user clicks "Ok" to initiate a payment to when a command is sent to a server. This time is compared to the known approximation of time (i.e., the amount of time in which the function is expected to be completed) which may be retrieved by the system from a data repository.

The known approximation of time may be a window of time so as to provide some amount of threshold variation. That is, if a function is expected to be performed in 35 ms, the known approximation may be a range of 32 ms to 38 ms. By providing such a threshold, the likelihood of false positives (i.e., a detection of an issue when no actual issue exists) may be reduced.

When the measured time for the execution of the function falls outside of the range of the known approximation of time, remedial action is taken in step 550. Remedial action is taken because if measured time does not correspond to an expected known approximation, then the system is determined to not be operating properly, i.e., the system may have been compromised. When such a determination is made, the payment process may be interrupted and/or flagged for review. In some instances, an alert may be sent to the administrator and/or the owner of the account of subject to the potential breach. When the system flags the monitored activity, an administrator may perform a thorough investigation into what caused the system to operate outside of the expected parameters.

In considering the amount of time it takes for a function to execute, the system may normalize out the delays resulting from network latency. In other words, time delays related to network speed should not to be considered because the system is designed to detect malware operating within the application. Such malware typically does not affect network speeds. Also, network speed can vary depending on a variety of factors, including but not limited to the type of connection, the host server, the user device (e.g., components and configuration), and environmental characteristics external to the system.

Additionally, the system may normalize the measured time based on factors such as computing power and the number of concurrent applications being handled by the system. These two factors are critical in approximating the amount of time a function takes to execute because they represent the amount of resources available for handling the execution of the function—the fewer resources the system has at its disposal, the longer it would take to execute the function and vice versa. Normalizing the measured time effectively eliminates the variances resulting from systems having different amounts of resources which result in different amounts of times it takes to execute a function. The normalizing thus reduces the probability of erroneously detecting an anomaly in the execution of the functions.

Figure 6:
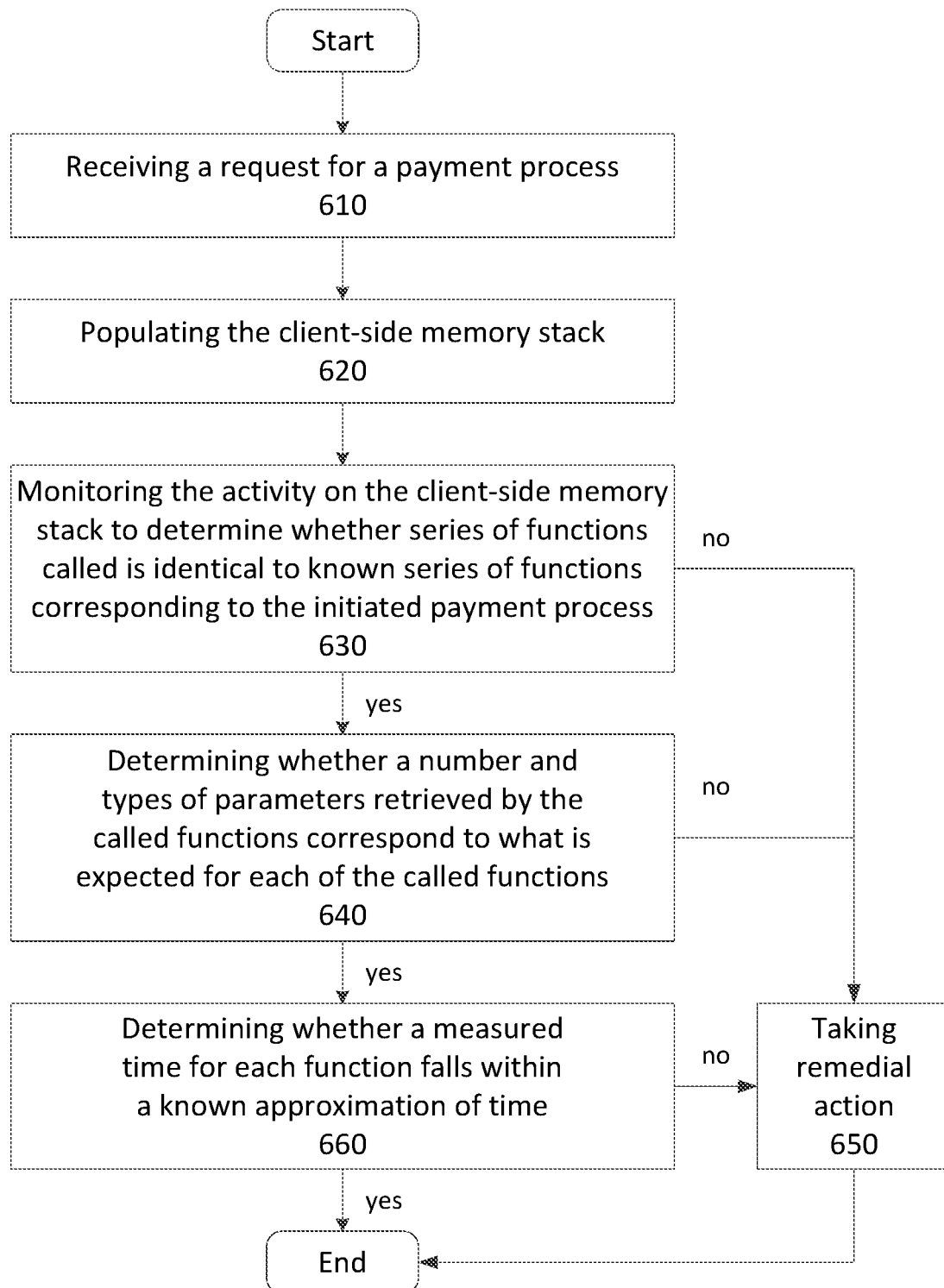
FIG. 6 is a flow diagram illustrating an exemplary malware detection process performed based on a known series and order of the functions, the parameters retrieved by the functions, and the timing of the execution of the functions.

In some embodiments, a combination of all three of the factors described above may be considered in identifying potential malware and taking remedial measures, as illustrated by exemplary process 600 in FIG. 6. For example, after the system receives a request for initiating payment for a transaction via a payment system application in step 610, the functions are called and the client-side memory stack is subsequently populated with the called functions in step 620. The system then monitors the activity on the client-side memory stack by determining whether the series of functions being called is identical to a known series of functions that correspond to the initiated payment process in step 630. If the system determines that the expected series of functions is called in the expected order, the system proceeds to step 640. Otherwise, the process proceeds to step 650 where remedial action is taken.

In step 640, the system determines whether a number and types of parameters retrieved by the called functions correspond to what is expected for each of the called functions. If the number and the types of the parameters retrieved corresponds to expectations, the system proceeds to step 660. If, however, the number or the types of the parameters is different from expectations, then the system proceeds to step 650 where remedial action is taken.

At step 660, the time for each function is measured and then compared to a corresponding known approximation of time in which the system expects the function to be performed. Determining that the measured time falls within a known approximation of time suggests that the system is operating properly and thus not compromised. If, however, the measured time falls outside of the known window, the system will determine that there's an anomaly among the functions and thus proceed to step 650 for remedial action to be taken.

While the above exemplary embodiment of utilizing all three of the factors in combination provides for identifying the series of functions, determining the parameters retrieved, and measuring the time of executing in a specific order, one of ordinary skill in the art may appreciate that the order of these steps may be rearranged in any order. In other words, the system may measure the time of execution first and then determine the number of parameters retrieved, before identifying the series of functions.

In some embodiments, the monitoring of the client-side memory stack is used to detect malware that may have been installed on the system. In certain instances, malware that is installed on the system may cause the payment application to conduct transactions that may be detrimental to the owner of an account and for the gain of a hacker. By detecting unusual activity on the memory stack that suggests that the system is not operating properly, the system may protect the owner of the account from such harms. Upon making a determination that the expected functions are not called in the expected order, remedial action may be taken. As discussed above, the system may suspend the initiated payment pending further review. The system may also alert an administrator and/or the owner of the account of the potential breach.

In some examples, the payment application may be a benign application that has been infected with malware. The malware may cause the application to process transactions that are not authorized by the owner of the account. For example, the malware may cause an unauthorized transfer of funds from the owner of the account to another party determined by the malware without the knowledge of the owner. For example, a hacker may cause malware to be installed on the application to transfer funds from the owner's account to the hacker's account.

In another embodiment, the malware may be used to obtain sensitive information of the owner of the account. For example, the malware may be used to record social security numbers, login information and associated credentials, credit card information, and other associated billing information from the owner. This misappropriated information may then be used later on to complete fraudulent transactions.

In some examples, in response to determining that the system is not operating properly and thus potentially compromised, the system may continue operation and separate or isolate calls for the application that are detected as unexpected calls. For example, when the system identifies calls to functions that are not expected, those functions are separated or isolated to be analyzed, and the expected calls may be allowed to proceed.

In some embodiments, the monitoring may be performed by an application external to the system. Alternatively, the monitoring may be performed via a plug-in in the browser to detect the anomalies in the function execution process. In one example, the plug-in may be part of PayPal's One Touch™ application, or the plug-in may be separate from the payment system application itself.

In some embodiments, monitoring the functions include comparing certain attributes of the monitored functions to a state machine in order to determine whether a match exists between the functions, or whether the attributes (e.g., time elapsed during execution) falls within acceptable parameters. The state machine may be implemented as a JavaScript application, a plug-in, or it may be incorporated into the browser as an external application. Alternatively, or in addition, the state machine may be implemented in the operating system of the computing device so that it's active and running in the background at boot up of the user device.

In some instances, if a determination has been made that the expected functions are not being performed in an expected manner, the system may require the user of the account to re-authenticate himself. For example, the remedial measures taken in steps 340, 440, 550 and 650 may be to present a captcha challenge, or any of a variety of authentication challenges to prove that the user is who he claims to be, or to prove that the user is a human. Since malware can cause a payment processing operation to initiate without a command with a user, presenting such a challenge may be effective in quickly identifying a situation where malware of this type is present.

In some embodiments, the payment system application securely stores login information on the device to streamline the payment within the checkout process. For example, when a PayPal One Touch™ transaction is initiated, the user will have already been logged into the user's PayPal account. In this example, when payment is initiated, an authentication process may be skipped over and messages corresponding to making the payment are processed by JavaScript. As such, requiring re-authentication when an anomaly is detected in the execution of the functions will be a useful deterrent against hacking.

While the exemplary embodiments describe the client-side memory stack as being a JavaScript stack, one of ordinary skill in the art will appreciate that the functions may be called to any type of queuing scheme that is used for running functions in a particular order.

The user device described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system comprising:
   one or more hardware processors; and
   a non-transitory memory storing instructions that, when executed by the one or more hardware processors, causes the one or more hardware processors to perform operations comprising:
      receiving, from a first application of a computing device that is not part of the system, a request for performing a payment process associated with an account;
      monitoring, via a second application of the computing device, an execution of a set of functions from a client-side memory stack of the computing device, the client-side memory stack being populated with the set of functions corresponding to the payment process;
      determining a malicious operating condition of the computing device based on the monitoring, wherein the determining the malicious operating condition of the computing device comprises determining that the set of functions being executed by the computing device from the client-side memory stack is different from an expected set of functions or that an order in which the set of functions is being executed by the computing device from the client-side memory stack is different from an expected order of execution of the set of functions corresponding to the payment process; and
      in response to determining the malicious operating condition of the computing device, executing, via the second application, a remedial action on the computing device.

2. The system of claim 1, wherein the client-side memory stack is a JavaScript stack.

3. The system of claim 1, wherein the executing the remedial action comprises interrupting the execution of the set of functions.

4. The system of claim 3, wherein the operations further comprise:
   presenting a re-authentication challenge on the computing device;
   receiving, via the computing device, authentication data associated with the re-authentication challenge;
   authenticating a user of the computing device for using the account based on the authentication data; and
   causing the computing device to resume the execution of the set of functions.

5. The system of claim 1, wherein the operations further comprise identifying at least one function in the set of functions that is not included in the expected set of functions.

6. The system of claim 1, wherein the operations further comprise in response to determining the malicious operating condition of the computing device, transmitting an alert to a device associated with one of an administrator or an owner of the account.

7. The system of claim 1, wherein the operations further comprise sending a notification to a payment processing server hosting the account.

8. A method comprising:
   receiving, from a first application of a computing device, a request for performing a payment process associated with an account;
   monitoring, via a second application of the computing device, an execution of a set of functions from a client-side memory stack of the computing device, the client-side memory stack being populated with the set of functions corresponding to the payment process;
   determining an operating condition of the computing device based on the monitoring, wherein the determining the operating condition comprises detecting that a set of parameters retrieved by the computing device based on executing a first function of the set of functions is different from an expected set of parameters associated with the payment process; and
   executing, in response to determining the operating condition of the computing device, a remedial action.

9. The method of claim 8, wherein the client-side memory stack is a JavaScript stack.

10. The method of claim 8, wherein the executing the remedial action comprises interrupting the execution of the set of functions.

11. The method of claim 10, further comprising:
    presenting, on the computing device, a re-authentication challenge;
    receiving, via the computing device, authentication data associated with the re-authentication challenge;
    authenticating a user of the computing device for using the account based on the authentication data; and causing the computing device to resume the execution of the set of functions.

12. The method of claim 8, wherein an execution of each function in the set of functions causes the computing device to retrieve one or more parameters corresponding to the function.

13. The method of claim 8, further comprising:
identifying a number of parameters retrieved by the computing device based on executing the first function; and
comparing the number against an expected number of parameters associated with the payment process.

14. The method of claim 8, further comprising in response to determining the operating condition, transmitting an alert to a device associated with one of an administrator or an owner of the account.

15. A non-transitory machine-readable medium having stored thereon machine-readable instructions executable to cause performance of operations comprising:
receiving, from a first application of a computing device, an indication that the computing device has initiated a payment process associated with an account;
monitoring, via a second application of the computing device, an execution of a set of functions from a client-side memory stack of the computing device, the client-side memory stack being populated with the set of functions corresponding to the payment process;
determining an operating condition of the computing device based on the monitoring, wherein the determining the operating condition comprises determining that an execution time of one function of the set of functions by the computing device is different from an expected execution time for a corresponding function of the payment process; and
executing, in response to determining the operating condition, a remedial action for the payment process.

16. The non-transitory machine-readable medium of claim 15, wherein the client-side memory stack is a JavaScript stack.

17. The non-transitory machine-readable medium of claim 15, wherein the executing the remedial action comprises interrupting the execution of the set of functions.

18. The non-transitory machine-readable medium of claim 17, wherein the operations further comprise:
presenting, on the computing device, a re-authentication challenge;
receiving, via the computing device, authentication data associated with the re-authentication challenge; and
authenticating a user of the computing device for using the account based on the authentication data; and
causing the computing device to resume the execution of the set of functions.

19. The non-transitory machine-readable medium of claim 15, wherein the operations further comprise:
measuring a time duration for the computing system to execute a first function of the set of functions; and
determining if the measured time duration falls within a known approximate window of time for executing the first function.

20. The non-transitory machine-readable medium of claim 14, wherein the operations further comprise in response to determining the operating condition of the computing device, transmitting an alert to a device associated with one of an administrator or an owner of the account.

* * * * *